US010239434B2

(12) United States Patent
Gomez et al.

(10) Patent No.: US 10,239,434 B2
(45) Date of Patent: Mar. 26, 2019

(54) VEHICLE SEAT WITH CENTER SEAT CUSHION AND CONSOLE ARMREST

(71) Applicant: Johnson Controls Technology Company, Plymouth, MI (US)

(72) Inventors: John Gomez, Howell, MI (US); Walter Merchant, Rochester Hills, MI (US); Emery Jay Zadina, Canton, MI (US); Mark Milner, White Lake, MI (US)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 125 days.

(21) Appl. No.: 15/290,687

(22) Filed: Oct. 11, 2016

(65) Prior Publication Data

US 2017/0203678 A1 Jul. 20, 2017

Related U.S. Application Data

(60) Provisional application No. 62/278,663, filed on Jan. 14, 2016.

(51) Int. Cl.
*B60N 3/10* (2006.01)
*B60N 2/005* (2006.01)
*B60N 2/75* (2018.01)

(52) U.S. Cl.
CPC ............ *B60N 3/102* (2013.01); *B60N 2/005* (2013.01); *B60N 2/757* (2018.02)

(58) Field of Classification Search
None
See application file for complete search history.

(56) References Cited

U.S. PATENT DOCUMENTS

| 3,791,995 A | 2/1974 | Chay | |
|---|---|---|---|
| 4,715,652 A * | 12/1987 | Ward | A47C 1/16 297/188.11 |
| 5,253,838 A * | 10/1993 | Spykerman | B60N 2/793 248/311.2 |
| 6,386,629 B1 * | 5/2002 | Severinski | B60N 2/3011 297/188.1 |
| 6,719,344 B2 * | 4/2004 | Ono | B60R 7/04 220/813 |

(Continued)

FOREIGN PATENT DOCUMENTS

| CN | 104 884 300 A | 9/2015 |
|---|---|---|
| DE | 203 20 522 U1 | 10/2004 |

(Continued)

*Primary Examiner* — David E Allred
(74) *Attorney, Agent, or Firm* — McGlew and Tuttle, P.C.

(57) ABSTRACT

A vehicle seat includes a backrest and a seat base connected to the backrest. The seat base includes a first cushion portion and a second cushion portion with an insert space between the first cushion portion and the second cushion portion. A cushion and console assembly is disposed in the insert space. The cushion and console assembly includes a liner base, an armrest assembly and a displacement connection between the armrest assembly and the liner base. The displacement connection guides a movement of the armrest assembly relative to the liner base between a stowed position, in which the armrest assembly upper surface forms at least a part of a center seat cushion, and an armrest position, with the upper surface raised upwardly and at a changed angle relative to the first cushion portion and the second cushion portion.

17 Claims, 5 Drawing Sheets

(56) References Cited

U.S. PATENT DOCUMENTS

| | | | | |
|---|---|---|---|---|
| 9,022,466 B2* | 5/2015 | Cinco | ................... | B60N 2/793 |
| | | | | 297/188.19 |
| 2005/0062320 A1* | 3/2005 | Duerr | ...................... | B60N 3/10 |
| | | | | 297/188.19 |
| 2007/0205638 A1* | 9/2007 | Schlecht | ................ | B60N 2/757 |
| | | | | 297/113 |
| 2016/0362029 A1* | 12/2016 | Masatsugu | ............. | B60N 3/102 |
| 2018/0022247 A1* | 1/2018 | Attala | ................... | B60N 2/763 |
| | | | | 297/188.17 |

FOREIGN PATENT DOCUMENTS

| | | | | |
|---|---|---|---|---|
| FR | 2804640 A1 * | 8/2001 | ............ | B60N 2/757 |
| GB | 24 12 849 A | 10/2005 | | |

\* cited by examiner

VEHICLE SEAT WITH CENTER SEAT CUSHION AND CONSOLE ARMREST

CROSS REFERENCE TO RELATED APPLICATIONS

This application claims the benefit of priority of U.S. provisional application 62/278,663, filed Jan. 14, 2016, the entire contents of which are incorporated herein by reference.

FIELD OF THE INVENTION

The present invention relates to a vehicle seat such as a second row vehicle seat of a passenger vehicle.

BACKGROUND OF THE INVENTION

Second row and third row vehicle seats (rear vehicle seats) of passenger vehicles are often provided as bench type seats, with the seat base (cushion) extending from one side of the interior of the vehicle to the other side of the interior of the vehicle. The seat base or cushion is provided for two or more occupants, such as a right side occupant space, a center occupant space and a left side occupant space. The backrest (seat back) is similarly configured for two or more occupants.

The backrest may be of a multipart configuration with a fold-down feature, allowing a portion (one or both of two backrest parts with a 50-50 relationship or one or both of two backrest parts with a 60-40 relationship) to be folded down to provide access to the rear of the vehicle (such as to a rear storage trunk) and to allow transportation of items that extend from the storage trunk into the passenger seating area. The backrest may also include other pass-through arrangements such as a ski pass openings. Such backrests may also include armrests that pivot down, such as in the center region, providing left side and right side occupants with an armrest.

The provision of an armrest can become complicated in combination with fold down backrest parts or other access features for access to the rear or trunk of a vehicle. Further, with the armrest pivoted down, the center occupant space cannot be used for an occupant and the region below the armrest is not used.

SUMMARY OF THE INVENTION

It is an object of the invention to provide a vehicle seat with a center occupant space with a cushioned portion that functions as a seat (cushion) for a center occupant and also provides center console features such as an armrest function and a storage space.

According to the invention, a vehicle seat is provided with a backrest and a seat base connected to the backrest. The seat base comprises a first cushion portion and a second cushion portion with an insert space between the first cushion portion and the second cushion portion. A cushion and console assembly is disposed in the insert space. The cushion and console assembly comprises a liner base, an armrest assembly and a displacement connection between the armrest assembly and the liner base. The displacement connection guides a movement of the armrest assembly relative to the liner base between a stowed position, in which the armrest assembly upper surface forms at least a part of a center seat cushion, and an armrest position, with the upper surface raised upwardly and at a changed angle relative to the first cushion portion and relative to the second cushion portion.

The displacement connection may advantageously be a pivot and sliding connection between the armrest assembly and the liner base. The pivot and sliding connection supports a movement of the armrest assembly relative to the base between the stowed position, in which the armrest assembly upper surface forms at least a part of a center seat cushion, and the armrest position, with the upper surface raised upwardly relative to the first cushion portion and the second cushion portion.

The seat may be a rear seat—second row seat or further rearward seat. The first cushion portion may form a drivers side rear occupant seating area and the second cushion portion may form a passenger side rear occupant seating area. The armrest assembly upper surface of the center seat cushion, with the armrest assembly in the stowed position, may advantageously form a center rear occupant seating area.

The armrest assembly may cover a storage space in the stowed position. The storage space may be accessible in the armrest position.

The pivot and sliding connection may comprise a link pivotably connected to the armrest assembly and pivotably connected to the liner base. The pivot and sliding connection may further comprise a slots, provided at the liner base, and slot inserts provided at the armrest assembly. The slot inserts may each be inserted into a respective one of the slots with the slots forming a guiding track for a sliding of the armrest assembly relative to the liner base. The armrest assembly may be pivotably connected to the slot inserts, for pivoting relative to the slot inserts as the slot inserts slide in the slots.

The vehicle seat may further comprise a spring arrangement biasing the armrest assembly into an armrest position. The spring arrangement may be connected to the pivot link to bias the link toward the armrest position. The spring arrangement may also include spring elements that act on the armrest assembly relative to the liner base to bias the slot inserts in the respective slot toward the armrest position.

The vehicle seat may further comprise a locking device that is connected to the armrest assembly and is connected to the liner base for locking a position of the armrest assembly relative to the liner base. The locking device may comprise a moveable latching release arm supported by the armrest assembly and a latch seat provided by the liner base. The latching release arm may be moved into a locked engaging position with the latch seat. The locking device may further comprise a locking spring arrangement biasing the latching element toward the locked engaging position and a release handle connected to the armrest assembly and accessible from an outside of the armrest assembly and connected to the latching release arm to move the latching release arm into an unlocked position.

The vehicle seat may further comprise a cup holder arrangement connected to the cushion and connected to the console assembly. The cup holder arrangement comprises a cup holder tray that is movable between a stowed cup holder position and an extended access position. The cup holder tray is moveable between the stowed cup holder position and the extended access position with the armrest assembly in each of the armrest position and the stowed position. The cup holder arrangement may further comprise cup holder tracks provided on the liner base. The cup holder tray moves along the tracks between the stowed cup holder position and an extended access position.

According to a further aspect of the invention, a vehicle cushion and console assembly is provided comprising a liner base, an armrest assembly and a displacement connection between the armrest assembly and the liner base. The displacement connection guides a movement of the armrest assembly relative to the liner base between a stowed position, in which the armrest assembly upper surface forms at least a part of a center seat cushion, and an armrest position, with the upper surface raised upwardly and at a changed angle relative to the first cushion portion and the second cushion portion.

The cushion console provides the perception of a seamless front console extending into the rear passenger space, providing occupants with additional storage and comfort in a rear seat application. The cushion console is designed to be deployed the majority of the time, but simply converts back to a center seating position when needed. The cushion console does not occupy regions of the backrest (seat back) so as top not interfere with that. The cushion console configuration provides additional packaging (storage) space in the seat and allows for a more comfortable center occupant torso angle.

The cushion console provides increased packaging space in the not always used center occupant space. The armrest feature provides good ergonomic aspects with the cushion providing a desired center occupant torso angle. The armrest feature eliminates additional armrest structure metals.

The cushion console provides the appearance of rear bucket seats to provide a vehicle with the look of quad bucket seats. Front row comfort is provided in a rear seat. The cushion console provides the vehicle with a rear central console integrated with the front row console.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, the invention comprises a vehicle seat generally designated 10 that includes a backrest 20 and a seat base (cushion) 30. The backrest 20 and seat base 30 are configured with three occupant spaces. The backrest 30 has a left side backrest portion 22, a center backrest portion 24 and a right side backrest portion 26. The seat base 30 has a left side cushion portion 32, a center cushion portion 34 and a right side cushion portion 36.

Figure 8:
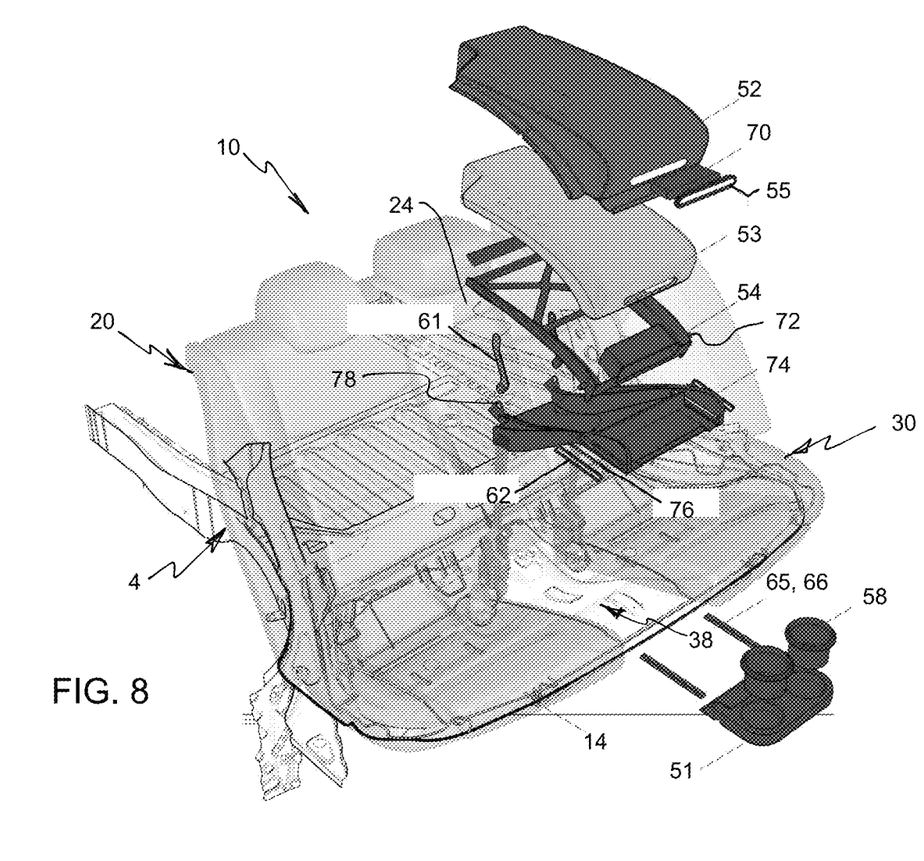
FIG. 8 is a perspective view showing the vehicle seat as partially transparent, to show structural features including structural features of the vehicle, and with the cushion and console assembly shown in an exploded view.

The vehicle seat 10 is preferably a second row seat or other rear row seat. The occupant spaces are the drivers side space (vehicle left side), passenger-side space (vehicle right side) and a center occupant space. However, the vehicle seat 10 could also be a front row seat with a driver seat portion, a front passenger seat portion and front center passenger seat portion (possibly for a truck cab). The vehicle seat 10 is mounted to a vehicle frame 4 of a vehicle and includes a wire reinforcement 14 cooperating with a seat base support/frame. The cushion portion 32, the cushion portion 34 and the cushion portion 36 are configured with an insert space between the cushion portion 32 and the cushion portion 36 to form an insert space 38 (FIG. 8).

Figure 1:
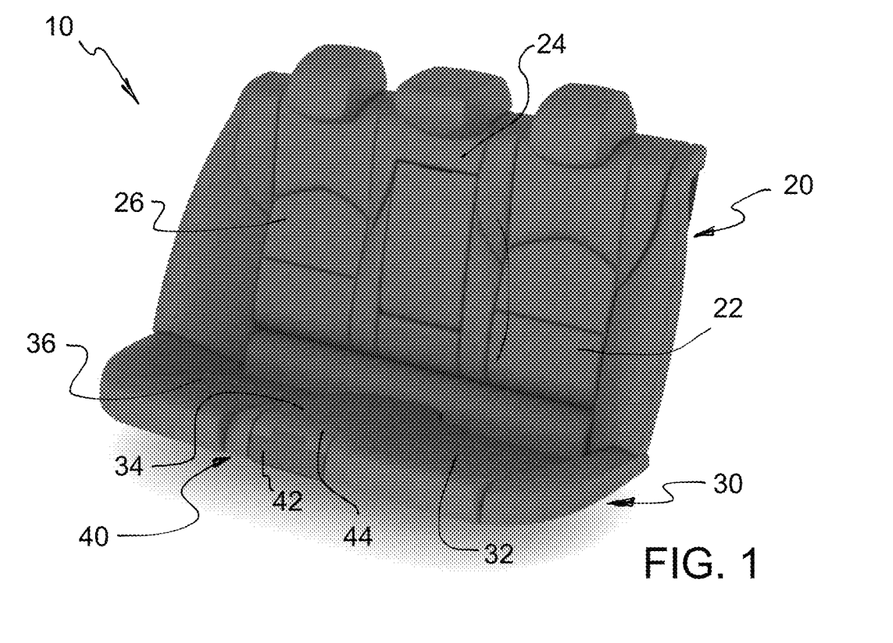
FIG. 1 is a perspective view of a vehicle seat according to the invention.
Figure 4:
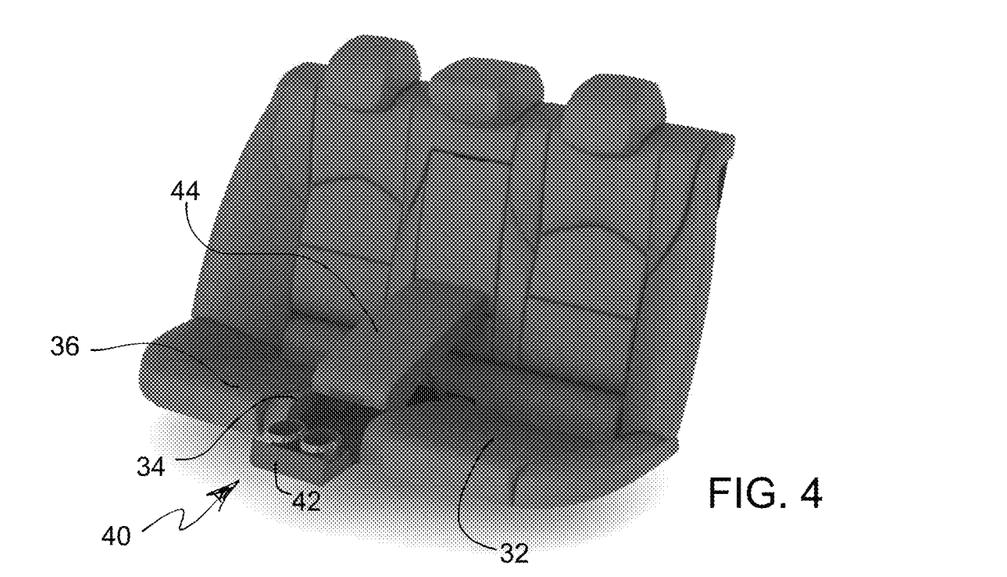
FIG. 4 is a perspective view of the vehicle seat of FIG. 1, showing the armrest assembly in an armrest position, with the cup holder in an extended position.
Figure 5:
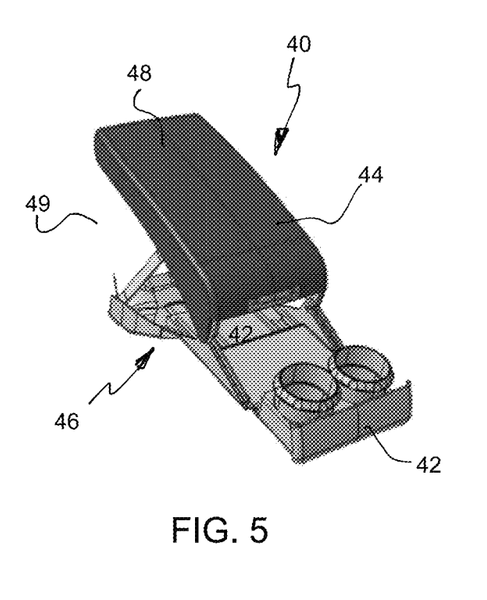
FIG. 5 is a perspective view of the cushion and console assembly, showing the armrest assembly in an armrest position.
Figure 6:
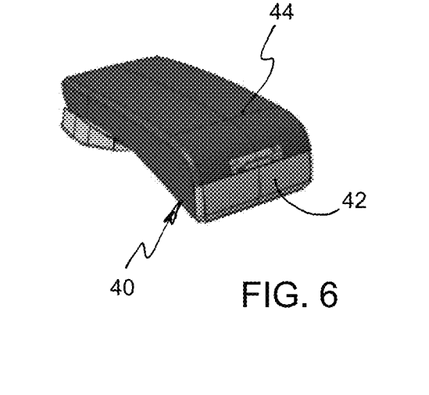
FIG. 6 is a perspective view of the cushion and console assembly, showing the armrest assembly in a stowed position.

A cushion and console assembly 40 is disposed in the insert space 38. The cushion and console assembly 40 includes a liner base 51, cup holder assembly 42 and an armrest assembly 44. As shown in FIG. 5, a displacement connection 46 is provided connecting between the armrest assembly 44 and the liner base 51. The displacement connection 46 guides the movement of the armrest assembly 44 relative to the liner base 51, between a stowed position (FIGS. 1, 2 and 6), in which the armrest assembly upper surface 48 forms at least a part of an upper surface of a center seat cushion portion 34 and an armrest position (FIGS. 3, 4 and 5), with the upper surface 48 raised upwardly and at a changed angle relative to the adjacent cushion portion 32 and the adjacent cushion portion 36. The displacement provides an armrest feature for the left and right occupant spaces. The armrest assembly 44 covers a storage space 49 in the stowed position. The storage space 49 is accessible in the armrest position. The displacement connection 46 may, in the alternative, guide the upper surface 48 upwardly and at the same angle relative to the first cushion portion and the second cushion portion, but the inclination of the armrest, in the armrest position, is considered ergonomically advantageous.

Figure 7:
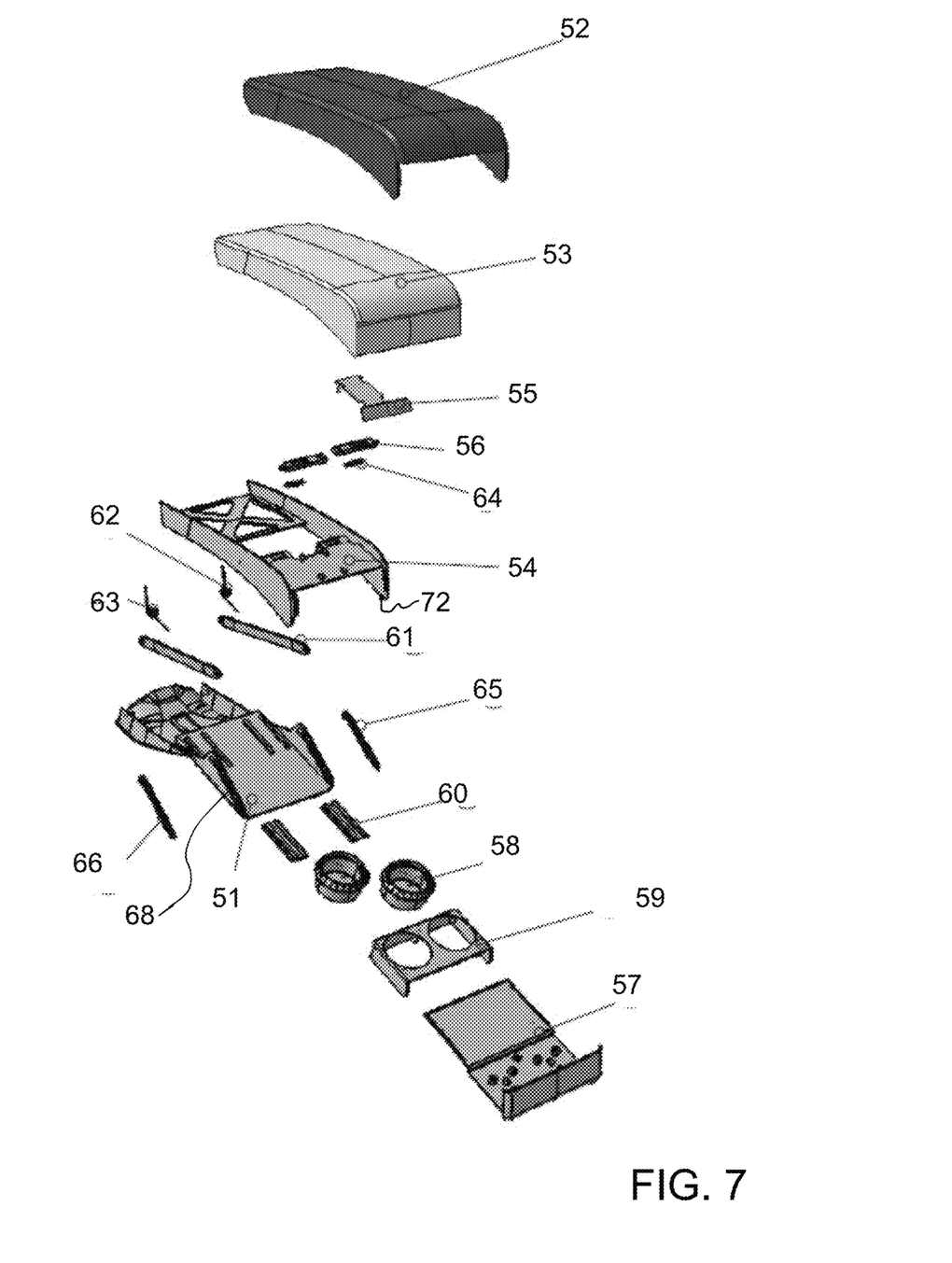
FIG. 7 is an exploded view of the cushion and console assembly.

FIG. 7 shows an embodiment of the cushion and console assembly 40 with the displacement connection 46 in the form of a pivot and sliding connection, between the armrest 44 assembly and the liner base 51. The displacement connection 46 supports movement of the armrest assembly 44 relative to the liner base 51, between the stowed position and the armrest position. The pivoting aspect of the pivot and sliding connection is provided by pivot links 61, which is pivotably connected to the liner base 51 and which is also pivotably connected to the armrest assembly 44. The sliding aspect of the pivot and sliding connection is provided by guide tracks or guide slots provided by guide slots 68 formed in the liner base 51. Guide slot inserts 65 and 66 each slide in one of the guide slots 68. The armrest assembly 44 has pivot posts 72 that are pivotable in corresponding bushings formed in the slot inserts 65 and 66.

The displacement connection 46 may be provided by other suitable mechanical linkages and may include another sliding slot arrangement (at the rear of the console assembly 40) instead of the pivot links 61. Further, the guiding tracks do not need to be linear and either a forward or a rearward guiding track may be curved. Further, both the forward and rearward guiding aspects of the displacement connection 46 may be formed by one or more pivot links. For example, a forward pivot link may be provided, pivotably connected to the armrest assembly 44 and pivotably connected to the liner base 51. This forms a so-called four bar linkage (the linking bars are the rear pivot links 61, forward pivot links, the armrest assembly 44 and the liner base 51). The rear or forward pivot links may be part of a more complicated multiple link pivot arrangement. Further, one or both of the armrest assembly 44 and the liner base 51 may include guard portions which cover all or part of the pivot links to protect the occupants. Such guard portions may be fixed to the armrest assembly 44 (and move therewith) and/or be fixed to the liner base 51.

The armrest assembly 44 includes a fabric/material trim cover (trim) 52 covering foam 53. The foam 53 is supported by the armrest structure 54. The armrest structure 54 is configured with connections with the guide slot inserts 65, 66, allowing both a sliding and a pivoting motion of the armrest structure 44 relative to the liner base 51. FIG. 8 shows a slightly modified version of the pivot and sliding connection wherein the pivot links 61 are connected to similar pivots (pivot bushings) 78 of the liner base 51 and the armrest structure 54 includes track follower posts 72 that slide or role in post-guide track 74 formed in the wider base 51.

The displacement connection 46 is provided with a spring arrangement to bias the armrest assembly 44 toward the armrest position. The spring arrangement comprises springs 62 and 63 acting on the pivot links 61 (FIG. 7). This may comprise coil spring fittings (see also FIG. 8). This configuration biases the links 61 toward the armrest position. The spring arrangement may also comprise other springs that act on the armrest assembly 44 relative to the liner base 51. FIG. 8 shows the arrangement of springs 76 that act on the track follower posts 72 or act on the slot inserts 65, 66 in the respective slot of the liner base 51 to bias the armrest assembly 44 toward the armrest position.

The cushion and console assembly 40 further comprises a locking device connected to the armrest assembly 44 and connected to the liner base 51 for locking a position of the armrest assembly relative to the liner base. As shown in FIG. 7, the locking device includes a release handle 55, which is displaceably mounted at the armrest structure 54 and one or more release mechanism arms 56, which is displaceably mounted at the armrest structure 54. The release handle 55 is accessible from an outside of the armrest assembly 44. The moveable latching release arms 56 engage a latch seat or catch provided by the liner base 51, whereby the latching release arm is moveable into a locked engaging position with the latch seat or catch formed or supported by the liner base 51. This holds the armrest assembly 44 in the cushion position. Actuating the release handle 55, with a sliding motion, disengages the release arms 56 from the latch seat to move the latching release arms 56 into an unlocked position. This allows the armrest assembly 44 to be displaced relative to the liner base 51 due to the force applied by the spring arrangement. The locking device further includes a locking spring arrangement with a release mechanism spring 64 biasing the latching element and the release handle 56 toward the locked engaging position. FIG. 8 shows the locking device with the release handle in the form of a handle bezel 55 which is operatively connected with a touch control module 70.

Figure 2:
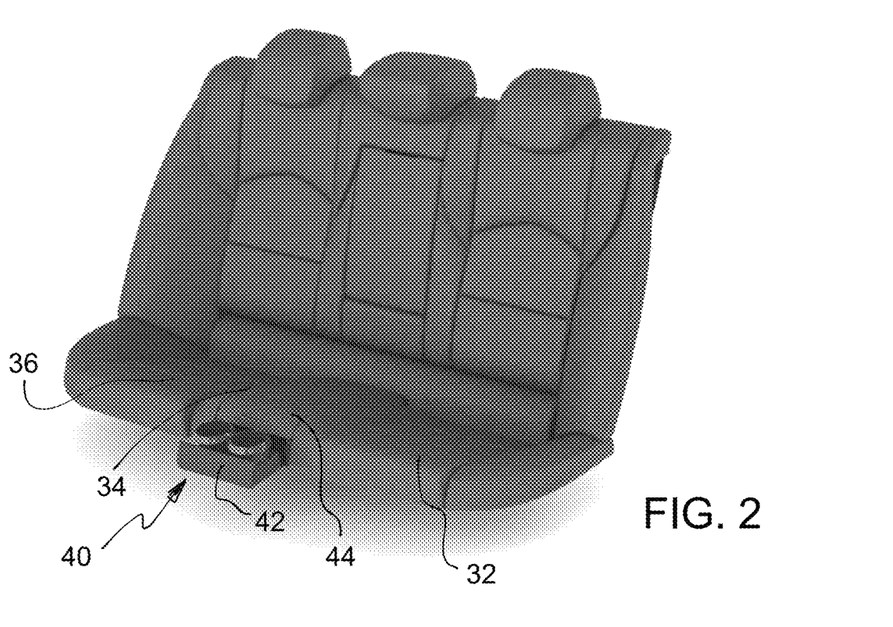
FIG. 2 is a perspective view of the vehicle seat of FIG. 1, showing the cup holder in an extended position for use.
Figure 3:
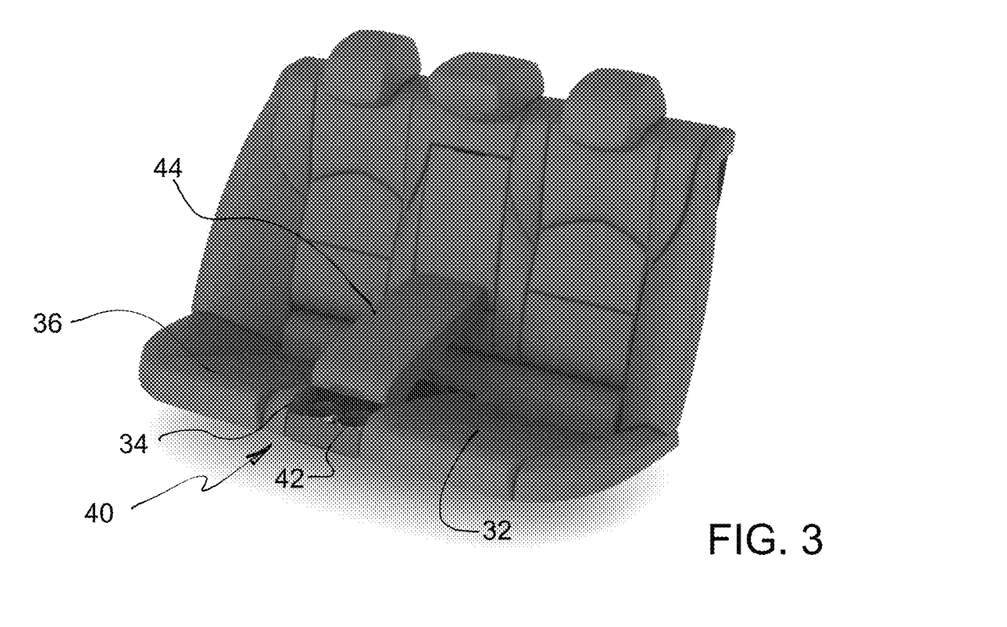
FIG. 3 is a perspective view of the vehicle seat of FIG. 1, showing the armrest assembly in an armrest position.

The cup holder arrangement 42 may be connected as a part of the cushion and console assembly 40. The cup holder arrangement 42 comprises a cup holder tray 57 that is movable between a stowed cup holder position (FIGS. 1, 3, 5 and 6) and an extended access position (FIGS. 2 and 4). A cup holder support structure 59 is mounted on the cup holder tray 57 and supports cup holder inserts 58. The cup holder tray 57 has followers connected to cup holder tracks 60 so as to be moveable between the stowed cup holder position and the extended access position with the armrest assembly in each of the armrest position and the stowed position. Further, with the armrest assembly 44 in the armrest position, the cup holder inserts 58 are advantageously functionally accessible, even with the cup holder tray 57 in the stowed cup holder position (FIG. 3).

The armrest structure 54 as well as the liner base 51, the cup holder arrangement 42 and the locking device 55, 56, 70 may be made of plastic. The console assembly 40 may be robust, provide the armrest and storage space functionality and also present an overall reduction in weight for the vehicle seat 10.

While specific embodiments of the invention have been shown and described in detail to illustrate the application of the principles of the invention, it will be understood that the invention may be embodied otherwise without departing from such principles.

What is claimed is:

1. A vehicle seat comprising:
    a backrest; and
    a seat base connected to the backrest, the seat base comprising a first cushion portion and a second cushion portion with an insert space between the first cushion portion and the second cushion portion and a cushion and console assembly disposed in said insert space, the cushion and console assembly comprising:
    a liner base;
    an armrest assembly; and
    a pivot and sliding connection between the armrest assembly and the liner base, the pivot and sliding connection comprising a link having a first end and a second end spaced from the first end, which link is pivotably connected at the first end to the armrest assembly and which is pivotably connected at the second end to the liner base, and a slot in one of the liner base and the armrest assembly and the other of the liner base and the armrest assembly slidably connected to the slot, wherein the pivot and sliding connection is configured for supporting movement of the armrest assembly relative to the base between a stowed position, in which the armrest assembly upper surface forms at least a part of a center seat cushion, and an armrest position, with the upper surface raised upwardly and tilted relative to the first cushion portion and the second cushion portion.

2. A vehicle seat according to claim 1, wherein:
    the seat is a rear seat, a second row seat, or a further rearward seat; and
    the first cushion portion forms a drivers side rear occupant seating area and a second cushion portion forms a passenger side rear occupant seating area and the armrest assembly upper surface of the center seat cushion, with the armrest assembly in the stowed position, forms a center rear occupant seating area.

3. A vehicle seat according to claim 1, wherein the armrest assembly covers a storage space in the stowed position and the storage space is accessible in the armrest position.

4. A vehicle seat according to claim 1, wherein the pivot and sliding connection further comprises:
    a plurality of slots including said slot, said plurality of slots provided at the liner base; and
    slot inserts provided at the armrest assembly, the slot inserts each being inserted into a respective one of the slots with the slots forming a guiding track for a sliding of the armrest assembly relative to the liner base, the armrest assembly being pivotably connected to the slot inserts, for pivoting relative to the slot inserts as the slot inserts slide in the slots.

5. A vehicle seat according to claim 1, further comprising a spring arrangement biasing the armrest assembly into the armrest position wherein the spring arrangement is connected to the pivot link to bias the link toward the armrest position.

6. A vehicle seat according to claim 4, further comprising a spring arrangement, wherein the spring arrangement acts on the acts on the armrest assembly relative to the liner base to bias the armrest assembly toward the armrest position.

7. A vehicle seat according to claim 1, further comprising a spring arrangement biasing the armrest assembly into the armrest position.

8. A vehicle seat according to claim 1, further comprising a locking device connected to the armrest assembly and connected to the liner base for locking a position of the armrest assembly relative to the liner base.

9. A vehicle seat according to claim 8, wherein the locking device comprises a moveable latching release arm supported by the armrest assembly and a latch seat provided by the liner base whereby the latching release arm is moveable into a locked engaging position with the latch seat.

10. A vehicle seat according to claim 9, wherein the locking device further comprises a locking spring arrangement biasing the latching element toward the locked engaging position and a release handle connected to the armrest assembly and accessible from an outside of the armrest assembly and connected to the latching release arm to move the latching release arm into an unlocked position.

11. A vehicle seat according to claim 1, further comprising a cup holder arrangement connected to the cushion and console assembly, the cup holder arrangement comprising a cup holder tray movable between a stowed cup holder position and an extended access position, wherein the cup holder tray is moveable between the stowed cup holder position and the extended access position with the armrest assembly in each of the armrest position and the stowed position.

12. A vehicle seat according to claim 11, wherein the cup holder arrangement further comprises cup holder tracks provided on the liner base, the cup holder tray moving along the tracks between the stowed cup holder position and an extended access position.

13. A vehicle seat comprising:
a backrest;
a seat base connected to the backrest, the seat base comprising a first cushion portion and a second cushion portion with an insert space between at least some of the first cushion portion and the second cushion portion and a cushion and console assembly disposed in said insert space, the cushion and console assembly comprising:
a liner base;
an armrest assembly;
a displacement connection between the armrest assembly and the liner base the displacement connection comprising a link having a first end and a second end spaced from the first end, which link is pivotably connected at the first end to the armrest assembly and which is pivotably connected at the second end to the liner base, and a slot in one of the liner base and the armrest assembly and the other of the liner base and the armrest assembly slidably connected to the slot, wherein the displacement connection is configured to guide movement of the armrest assembly relative to the liner base between a stowed position, in which the armrest assembly upper surface forms at least a part of a center seat cushion, and an armrest position, with the upper surface raised upwardly and at a changed angle relative to the first cushion portion and the second cushion portion.

14. A vehicle cushion and console assembly comprising:
a liner base;
an armrest assembly;
a displacement connection between the armrest assembly and the liner base the displacement connection comprising a link having a first end and a second end spaced from the first end, which link is pivotably connected at the first end to the armrest assembly and which is pivotably connected at the second end to the liner base, and a slot in one of the liner base and the armrest assembly and the other of the liner base and the armrest assembly slidably connected to the slot, wherein the displacement connection is configured to guide movement of the armrest assembly relative to the liner base between a stowed position, in which the armrest assembly upper surface is at a height configured to form at least a part of a center seat cushion for supporting a seated occupant, and the armrest position, with the upper surface raised upwardly and at a changed angle relative to the stowed position.

15. A vehicle cushion according to claim 14, wherein the displacement connection further comprises:
a plurality of slots including said slot, said plurality of slots provided at the liner base; and
slot inserts provided at the armrest assembly, the slot inserts each being inserted into a respective one of the slots with the slots forming a guiding track for a sliding of the armrest assembly relative to the liner base, the armrest assembly being pivotably connected to the slot inserts, for pivoting relative to the slot inserts as the slot inserts slide in the slots.

16. A vehicle cushion according to claim 14, further comprising a spring arrangement biasing the armrest assembly into the armrest position wherein the spring arrangement is connected to the pivot link to bias the link toward the armrest position.

17. A vehicle cushion according to claim 14, further comprising a locking device connected to the armrest assembly and connected to the liner base for locking a position of the armrest assembly relative to the liner base.

* * * * *